United States Patent
Taniguchi

(10) Patent No.: US 10,175,674 B2
(45) Date of Patent: Jan. 8, 2019

(54) PROGRAMMABLE LOGIC CONTROLLER CONFIGURED TO BACK UP TRANSMISSION DESTINATION MAIL ADDRESS DATA AND RESTORE THE TRANSMISSION DESTINATION MAIL ADDRESS DATA DURING REOPERATION

(71) Applicant: Mitsubishi Electric Corporation, Tokyo (JP)

(72) Inventor: Ippei Taniguchi, Aichi (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/515,903

(22) PCT Filed: Oct. 10, 2014

(86) PCT No.: PCT/JP2014/077181
§ 371 (c)(1),
(2) Date: Mar. 30, 2017

(87) PCT Pub. No.: WO2016/056121
PCT Pub. Date: Apr. 14, 2016

(65) Prior Publication Data
US 2017/0308051 A1    Oct. 26, 2017

(51) Int. Cl.
*H04L 12/58* (2006.01)
*G05B 19/05* (2006.01)
(Continued)

(52) U.S. Cl.
CPC .......... *G05B 19/056* (2013.01); *G05B 19/05* (2013.01); *G06F 11/14* (2013.01); *G06Q 10/107* (2013.01);
(Continued)

(58) Field of Classification Search
CPC ...... H04L 51/00; H04L 51/28; G06F 12/0246
See application file for complete search history.

(56) References Cited

U.S. PATENT DOCUMENTS

| | | | |
|---|---|---|---|
| 2002/0090971 A1* | 7/2002 | Suzuki | H04M 1/2745 455/550.1 |
| 2003/0060900 A1 | 3/2003 | Lo et al. | |

(Continued)

FOREIGN PATENT DOCUMENTS

| | | |
|---|---|---|
| CN | 101378370 A | 3/2009 |
| CN | 102859453 A | 1/2013 |

(Continued)

OTHER PUBLICATIONS

Communication dated Jan. 17, 2018 from the State Intellectual Property Office of the P.R.C. in counterpart Application No. 201480082581.6.

(Continued)

*Primary Examiner* — Jeong S Park
(74) *Attorney, Agent, or Firm* — Sughrue Mion, PLLC; Richard C. Turner

(57) ABSTRACT

A programmable logic controller includes: a parameter storage ROM to store transmission destination mail address data set as a parameter; a communication processing unit to acquire the transmission destination mail address data from an external apparatus; an internal device being a storing unit for storing the transmission destination mail address data acquired by the communication processing unit; an internal memory to store the transmission destination mail address data in the internal device when the transmission destination mail address data in the internal device is added data; a Flash ROM to store backup data of the transmission destination mail address data stored in the internal memory, and an arithmetic processing unit to perform processing for backing up, in the Flash ROM, the transmission destination mail (Continued)

address data acquired from the external apparatus and performs, in reoperation, processing for writing, in the internal memory.

3 Claims, 3 Drawing Sheets

(51) Int. Cl.
    *G06F 11/14*     (2006.01)
    *G06Q 10/10*     (2012.01)
    *G06F 12/02*     (2006.01)
    *G06F 13/00*     (2006.01)

(52) U.S. Cl.
    CPC .............. *H04L 51/00* (2013.01); *H04L 51/28* (2013.01); *G06F 12/0246* (2013.01); *G06F 13/00* (2013.01)

(56) References Cited

U.S. PATENT DOCUMENTS

| | | | |
|---|---|---|---|
| 2003/0084110 A1* | 5/2003 | Shono | H04L 51/066 709/206 |
| 2005/0267882 A1 | 12/2005 | Aupperlee et al. | |
| 2008/0046104 A1 | 2/2008 | Van Camp et al. | |
| 2010/0017598 A1* | 1/2010 | Rodriguez | H04L 51/28 713/156 |
| 2011/0161358 A1* | 6/2011 | Nagata | H04M 1/274525 707/769 |
| 2011/0249000 A1 | 10/2011 | Isenmann et al. | |
| 2012/0023180 A1* | 1/2012 | Fukuoka | G06Q 10/10 709/206 |
| 2012/0265838 A1 | 10/2012 | Nakano | |

FOREIGN PATENT DOCUMENTS

| | | |
|---|---|---|
| DE | 102007038340 A1 | 11/2012 |
| EP | 2317409 A1 | 5/2011 |
| JP | 01-220002 A | 9/1989 |
| JP | 07-319518 A | 12/1995 |
| JP | 08-185208 A | 7/1996 |
| JP | 10-161711 A | 6/1998 |
| JP | 10-268914 A | 10/1998 |
| JP | 2000-137506 A | 5/2000 |
| JP | 2003-162466 A | 6/2003 |
| JP | 2006-231591 A | 9/2006 |
| JP | 2007-012045 A | 1/2007 |
| JP | 2010-026948 A | 2/2010 |
| JP | 2014-119907 A | 6/2014 |

OTHER PUBLICATIONS

Taiwan Examination Report of Taiwanese Application No. 104132676 dated Sep. 9, 2016.
Notification of Reason for Refusal of Japanese Application No. 2015-534307 dated Aug. 20, 2015.
International Search Report of PCT/JP2014/077181 dated Jan. 13, 2015 [PCT/ISA/210].
Communication dated Dec. 20, 2017, Issued by the German Patent and Trademark Office in corresponding German Application No. 112014006946.9.
Communication dated Sep. 17, 2018 from the State Intellectual Property Office of the P.R.C. in counterpart Application No. 201480082581.6.

* cited by examiner

PROGRAMMABLE LOGIC CONTROLLER CONFIGURED TO BACK UP TRANSMISSION DESTINATION MAIL ADDRESS DATA AND RESTORE THE TRANSMISSION DESTINATION MAIL ADDRESS DATA DURING REOPERATION

CROSS REFERENCE TO RELATED APPLICATIONS

This application is a National Stage of International Application No. PCT/JP2014/077181, filed Oct. 10, 2014, the contents of which are incorporated herein by reference in its entirety.

FIELD

The present invention relates to a programmable logic controller equipped with a function of transmitting an electronic mail.

BACKGROUND

As a programmable logic controller (hereinafter referred to as PLC) that controls a controlled apparatus such as an industrial machine used in a factory or the like, there has been a programmable logic controller equipped with a function of transmitting an electronic mail to a designated transmission destination. Patent Literature 1 described below discloses a technology for defining, in a PLC, an event serving as a trigger and, when the event occurs, transmitting, by an electronic mail, data or a message indicating contents of the event.

The PLC equipped with the function of transmitting an electronic mail is triggered by a change in a value of a memory present inside the PLC called an internal device that temporarily stores data concerning execution of a command exclusive for the PLC or data concerning the controlled apparatus or a state change such as operation or stop of the PLC and transmits, by an electronic mail, data or a message indicating contents of the change. At this point, by setting a transmission destination mail address as a parameter, it is possible to designate the transmission destination mail address to the PLC. As an alternative method of designating the transmission destination mail address to the PLC, there is a method of designating a transmission destination mail address from an external apparatus and writing data of the transmission destination mail address in the internal device.

CITATION LIST

Patent Literature

Patent Literature 1: Japanese Patent Application Laid-Open No. 2007-12045

SUMMARY

Technical Problem

However, in the conventional PLC, when the transmission destination mail address is set by the parameter, the parameter cannot be changed during the operation of the PLC. Therefore, when setting of the transmission destination mail address is changed, there is a problem in that it is necessary to once stop the PLC, reset the parameter of the transmission destination mail address, operate the PLC again, and reflect the parameter.

When the transmission destination mail address is input and designated from the external apparatus during the operation, the data of the transmission destination mail address input from the external apparatus is written in the internal device. Therefore, when a power supply of the PLC is turned off once, the data is erased. Therefore, there is a problem in that it is necessary to input the transmission destination mail address again from the external apparatus after the reoperation.

The present invention has been devised in view of the above and an object of the present invention is to obtain a programmable logic controller that can use a transmission destination mail address changed during operation without resetting the transmission destination mail address after reoperation.

Solution to Problem

To solve the above-described problem, a programmable logic controller according to the present invention includes: a parameter storing unit for storing transmission destination mail address data set as a parameter; a communication processing unit to acquire the transmission destination mail address data from an external apparatus; an internal device, which is a storing unit for storing the transmission destination mail address data acquired by the communication processing unit; a volatile storing unit for storing the transmission destination mail address data in the internal device when the transmission destination mail address data in the internal device is addition data; a nonvolatile storing unit for storing backup data of the transmission destination mail address data stored in the volatile storing unit; and an arithmetic processing unit to perform processing for backing up, in the nonvolatile storing unit, the transmission destination mail address data acquired from the external apparatus and perform, in reoperation, processing for writing, in the volatile storing unit, the transmission destination mail address data backed up in the nonvolatile storing unit.

Advantageous Effects of Invention

The programmable logic controller according to the present invention achieves an effect that it is possible to use a transmission destination mail address changed during operation without resetting the transmission destination mail address after reoperation.

DESCRIPTION OF EMBODIMENTS

A programmable logic controller according to an embodiment of the present invention is explained in detail below with reference to the drawings. Note that the present invention is not limited by the embodiment.

Embodiment

Figure 1:
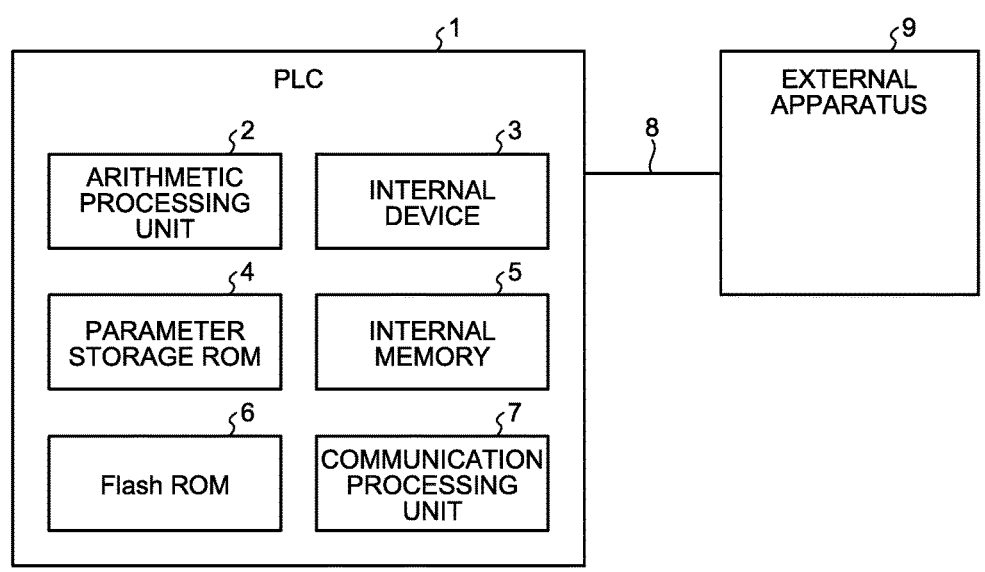
FIG. 1 is a block diagram depicting a configuration example of a PLC system.

FIG. 1 is a block diagram depicting a configuration example of a PLC system according to an embodiment of the present invention. The PLC system is a system equipped with a function of transmitting an electronic mail and including a PLC 1 that controls a not-shown controlled apparatus and an external apparatus 9 that performs, for example, addition and deletion of a transmission destination mail address to and from the PLC 1. The PLC 1 and the external apparatus 9 are connected via a communication cable 8.

The PLC 1 includes: an arithmetic processing unit 2 that performs arithmetic processing according to a sequence program according to operation from a user; an internal device 3, which is a storing unit used for temporarily storing data and the like in the arithmetic processing; a parameter storage ROM (Read Only Memory) 4, which is a parameter storing unit for storing the sequence program and data in which parameters such as transmission destination mail address data are set; an internal memory 5, which is a volatile storing unit for storing added transmission destination mail address data used during electronic mail transmission; a Flash ROM 6, which is a nonvolatile storing unit for storing backup data of added or updated transmission destination mail address data; and a communication processing unit 7 that performs communication such as transmission and reception of data with the external apparatus 9 via the communication cable 8.

Subsequently, operation for updating transmission destination mail address data during operation and transmitting an electronic mail after reoperation in the PLC 1 is explained. The reoperation means turning off a power supply once to stop operation and thereafter turning on the power supply to perform the operation again in the PLC 1.

Figure 2:
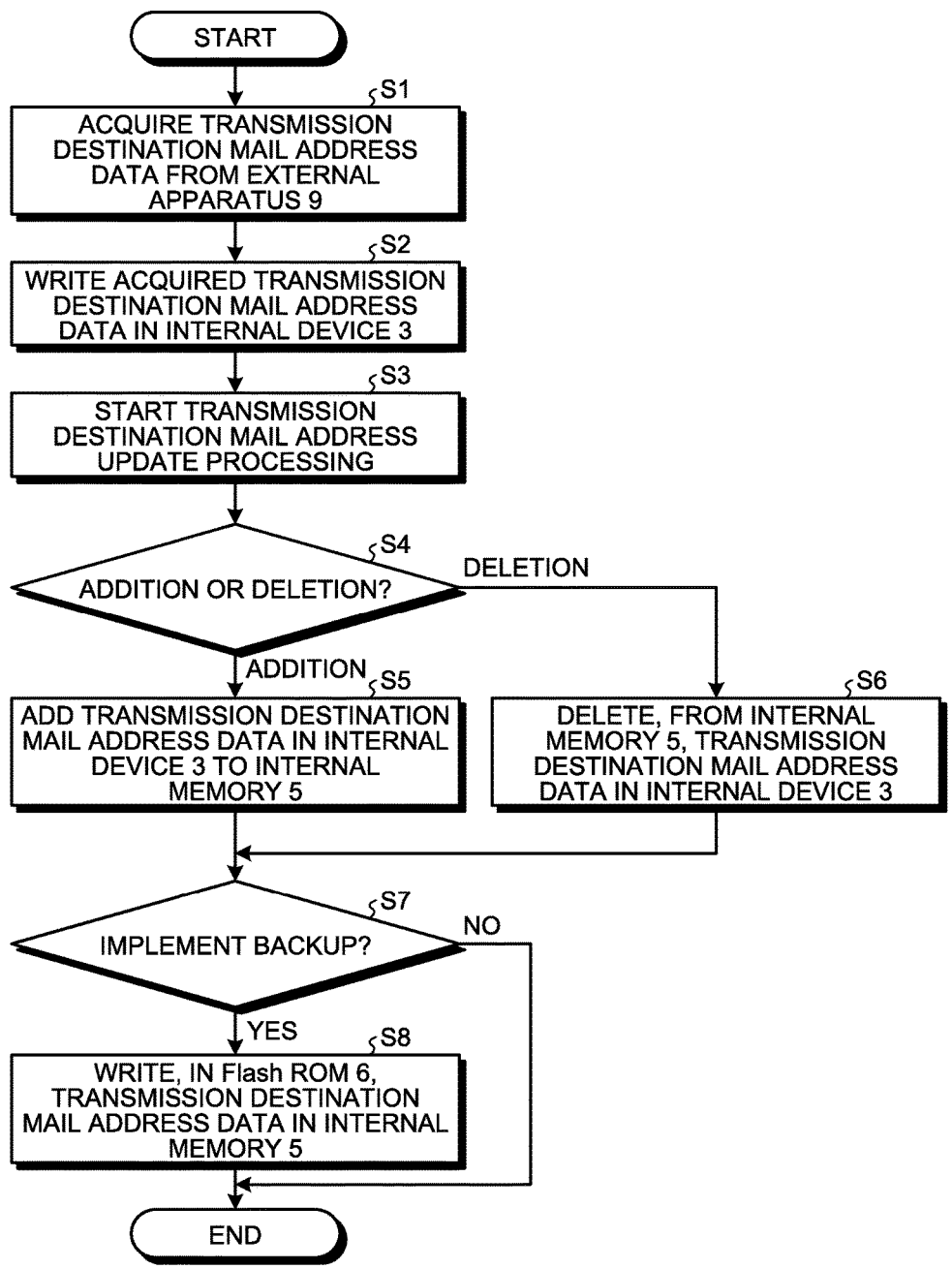
FIG. 2 is a flowchart depicting processing for updating a transmission destination mail address.

FIG. 2 is a flowchart depicting processing for updating a transmission destination mail address. First, in the PLC 1, the communication processing unit 7 acquires, via the communication cable 8, transmission destination mail address data input from the external apparatus 9 (step S1) and writes the acquired transmission destination mail address data in the internal device 3 (step S2). At this point, the external apparatus 9 transmits an update instruction for a transmission destination mail address to the PLC 1 together with the transmission destination mail address data. In the PLC 1, the communication processing unit 7 outputs the update instruction for the transmission destination mail address to the arithmetic processing unit 2.

Subsequently, the arithmetic processing unit 2 receives the update instruction for the transmission destination mail address from the external apparatus 9 and starts update processing for the transmission destination mail address (step S3). It is assumed that addition and deletion information indicating addition or deletion of transmission destination mail address data and backup implementation propriety information indicating whether backup is performed are added to the update instruction for the transmission destination mail address. Consequently, it is possible to optionally designate, from the external apparatus 9, addition or deletion of the transmission destination mail address data written in the internal device 3 and backup in the Flash ROM 6.

Note that, the addition of the transmission destination mail address data includes: addition of transmission destination mail address data anew; and change of contents of transmission destination mail address set as a parameter in the parameter storage ROM 4. When transmission destination mail address data is added anew, the number of usable transmission destination mail address data retained in the PLC 1 increases. However, when the contents of the transmission destination mail address data set as the parameter in the parameter storage ROM 4 are changed, the number of usable transmission destination mail address data retained in the PLC 1 does not increase.

The arithmetic processing unit 2 checks whether the designation by the addition and deletion information is addition or deletion (step S4). When the designation of the addition and deletion information is addition (addition at step S4), the arithmetic processing unit 2 adds the transmission destination mail address data of the addition designation written in the internal device 3 to the internal memory 5 (step S5). When the designation of the addition and deletion information is deletion (deletion at step S4), the arithmetic processing unit 2 deletes, from the internal memory 5, the transmission destination mail address data of the deletion designation added from the internal device 3 (step S6).

The arithmetic processing unit 2 checks, from the backup implementation propriety information, whether backup is implemented (step S7). When the backup is implemented (Yes at step S7), the arithmetic processing unit 2 writes the transmission destination mail address data in the internal memory 5, which is added or deleted updated data, in the Flash ROM 6 (step S8). When the backup is not implemented (No at step S7), the arithmetic processing unit 2 ends the processing without doing anything. Even when the PLC 1 has a function capable of selecting implementation propriety of backup, in this embodiment, it is assumed that the backup is implemented (Yes at step S7). Consequently, in the PLC 1, even when the power supply is turned off, it is possible to back up and retain, in the Flash ROM 6 as the nonvolatile storing unit, the transmission destination mail address data as the updated data in the internal memory 5.

Figure 3:
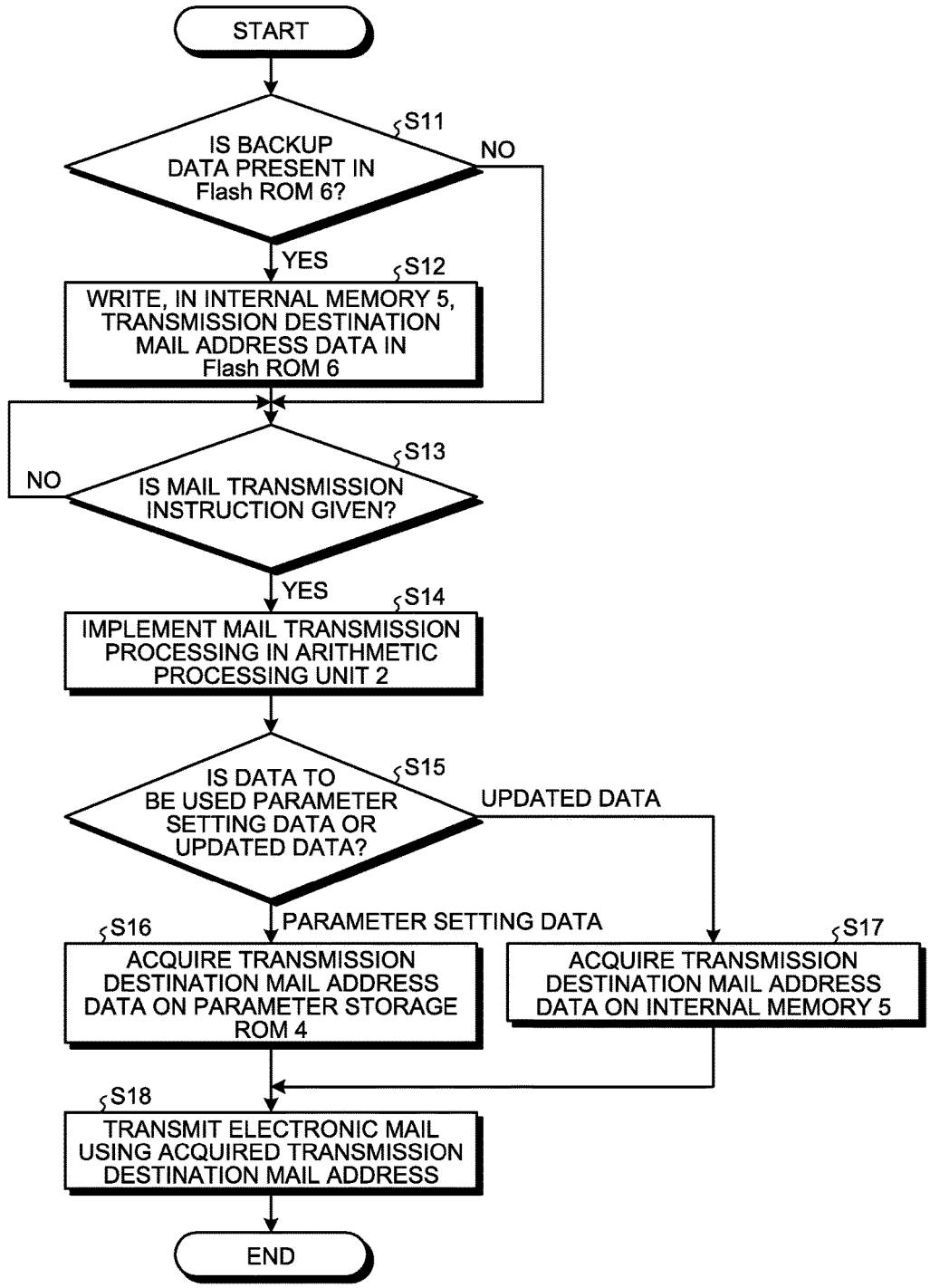
FIG. 3 is a flowchart depicting processing from turn-on of a power supply to a mail transmission processing end in reoperation of a PLC.

FIG. 3 is a flowchart depicting processing from turn-on of the power supply until a mail transmission processing end in the reoperation of the PLC 1. First, the arithmetic processing unit 2 checks whether backup data of transmission destination mail address data is present in the Flash ROM 6 after the power supply is turned on (step S11). When the backup data is present (Yes at step S11), the arithmetic processing unit 2 writes, in the internal memory 5, the transmission mail address data in the Flash ROM 6 (step S12). When the backup data is absent (No at step S11), the arithmetic processing unit 2 proceeds to the next processing without performing anything. Consequently, in the PLC 1, it is possible to restore, in the internal memory 5, transmission destination mail address data updated by addition or the like during operation up to the last time.

The arithmetic processing unit 2 checks whether a mail transmission instruction based on a trigger generated from the external apparatus 9 or the inside of the PLC 1 is given (step S13). When the mail transmission instruction is not given (No at step S13), the arithmetic processing unit 2 stays on standby until the mail transmission instruction is given. When the mail transmission instruction is given (Yes at step S13), the arithmetic processing unit 2 implements the mail transmission processing (step S14). The mail transmission instruction is transmitted from the external apparatus 9 or a component inside the PLC 1 in which an event serving as a target of the generated trigger occurs.

At this point, concerning data used for the transmission destination mail address, information concerning whether the transmission destination mail address data set as the parameter on the parameter storage ROM 4 is used; or the updated transmission destination mail address data on the internal memory 5 is used; is added to the mail transmission instruction. Consequently, it is possible to optionally select which of the transmission destination mail address mail data is used. In the external apparatus 9, the update instruction for the transmission destination mail address is given from the own apparatus. Therefore, it is possible to grasp whether the updated transmission destination mail address data is present on the internal memory 5. In the PLC 1, the arithmetic processing unit 2 receives the update instruction for the transmission destination mail address from the external apparatus 9 and performs the update processing for the transmission destination mail address. Therefore, it is possible to grasp whether the updated transmission destination mail address data is present on the internal memory 5 in the PLC 1, too.

The arithmetic processing unit 2 checks whether the data used for the transmission destination mail address is the parameter setting data on the parameter storage ROM 4 or the updated data on the internal memory 5 (step S15). When the data to be used is the parameter setting data (parameter setting data at step S15), the arithmetic processing unit 2 acquires the transmission destination mail address data on the parameter storage ROM 4 (step S16). When the data to be used is the updated data (updated data at step S15), the arithmetic processing unit 2 acquires the transmission destination mail address data on the internal memory 5 (step S17). The arithmetic processing unit 2 instructs the communication processing unit 7 to transmit an electronic mail using the acquired transmission destination mail address.

The communication processing unit 7 transmits an electronic mail using the data of the transmission destination mail address acquired by the arithmetic processing unit 2 (step S18).

As explained above, according to the present embodiment, to prevent the transmission destination mail address data changed from the external apparatus 9 during the operation from being erased by turn-off of the power supply, the PLC 1 writes the changed transmission destination mail address data in the Flash ROM 6, backs up the changed transmission destination mail address data, and restores the transmission destination mail address data written in the Flash ROM 6 during the reoperation. Consequently, in the PLC 1, it is unnecessary to reset the transmission destination mail address from the external apparatus 9 after the reoperation. It is possible to use the transmission destination mail address input from the external apparatus 9 before the reoperation and changed on the sequence program.

In the PLC 1, it is optionally selectable, according to the information concerning whether the transmission destination mail address data input from the external apparatus 9 is used or the transmission destination mail address data set as the parameter is used, which of the transmission destination mail address data is used. Consequently, even after the transmission destination mail address input from the external apparatus 9, it is possible to use the transmission destination mail address data set as the parameter without performing resetting of the parameter when it is desired to use the transmission destination mail address set as the parameter.

The PLC 1 in this embodiment is applicable to a system that performs, on the external apparatus 9 or the sequence program, change and deletion of a set transmission destination mail address.

The configuration explained in the embodiment above indicates an example of the contents of the present invention and can be combined with another publicly-known technology or a part of the configuration can be omitted or changed in a range not departing from the spirit of the present invention.

REFERENCE SIGNS LIST

1 programmable logic controller
2 arithmetic processing unit
3 internal device
4 parameter storage ROM
5 internal memory
6 Flash ROM
7 communication processing unit
8 communication cable
9 external apparatus

The invention claimed is:

1. A programmable logic controller comprising:
a parameter storing memory configured to store transmission destination mail address data set as a parameter;
a communication processor configured to acquire the transmission destination mail address data from an external apparatus;
an internal device, which is a memory configured to store the transmission destination mail address data acquired by the communication processor;
a volatile memory configured to store an updated version of the transmission destination mail address data stored in the internal device when an update instruction indicates that the transmission destination mail address data stored in the internal device is data of addition designation;
a nonvolatile memory configured to store backup data of the updated version of the transmission destination mail address data stored in the volatile memory; and
an arithmetic processor configured to update the transmission destination mail address data based on the update instruction to thereby generate the updated version of the transmission destination mail address data, to perform processing for backing up, in the nonvolatile memory, the updated version of the transmission destination mail address data stored in the volatile memory and to perform, in reoperation, processing for writing, in the volatile memory, the updated version of the transmission destination mail address data backed up in the nonvolatile memory,
wherein the arithmetic processor is further configured to analyze information indicating whether the transmission destination mail address data stored in the parameter storing memory or the updated version of the transmission destination mail address data stored in the volatile memory is to be used for mail transmission processing and to perform the mail transmission processing based on the analyzed information.

2. The programmable logic controller according to claim 1, wherein, when the update instruction indicates that a portion of the transmission destination mail address data stored in the internal device is data of deletion designation, the arithmetic processor is further configured to delete the portion of the transmission destination mail address data designated as a target of deletion from the volatile memory.

3. The programmable logic controller according to claim 1, wherein, when a mail transmission instruction is acquired, the arithmetic processor acquires the information indicating whether the transmission destination mail address data stored in the parameter storing memory or the updated version of the transmission destination mail address data stored in the volatile memory is to be used for mail transmission processing together with the mail transmission instruction.

\* \* \* \* \*